United States Patent
Lee et al.

(10) Patent No.: US 8,116,820 B2
(45) Date of Patent: Feb. 14, 2012

(54) METHOD FOR TRANSMITTING DATA IN MULTIPLE ANTENNA SYSTEM

(75) Inventors: Wook Bong Lee, Anyang-si (KR); Dong Ku Kim, Anyang-si (KR); Hyukjin Chae, Anyang-si (KR); Janghoon Yang, Anyang-si (KR); Bin Chul Ihm, Anyang-si (KR); Yohan Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 12/382,184

(22) Filed: Mar. 10, 2009

(65) Prior Publication Data
US 2009/0233560 A1    Sep. 17, 2009

(30) Foreign Application Priority Data

Mar. 11, 2008   (KR) .................. 10-2008-0022312

(51) Int. Cl.
*H04M 1/00* (2006.01)

(52) U.S. Cl. .................................................. 455/562.1
(58) Field of Classification Search ........................ None
See application file for complete search history.

(56) References Cited

U.S. PATENT DOCUMENTS

| 7,623,553 | B2 * | 11/2009 | Bhushan et al. ............... 370/527 |
| 7,898,956 | B2 * | 3/2011 | Semrad et al. ............... 370/235 |
| 7,974,240 | B2 * | 7/2011 | Liu et al. ....................... 370/329 |

* cited by examiner

*Primary Examiner* — Lincoln Donovan
*Assistant Examiner* — Sibin Chen
(74) *Attorney, Agent, or Firm* — McKenna Long & Aldridge LLP

(57) ABSTRACT

A method for transmitting data in a multi-antenna system includes determining a candidate mode in which a maximum upperbound approximation of an average total data rate is maximized as a transmission mode, selecting a user equipment to receive data by using the transmission mode, and transmitting data to the selected user equipment.

6 Claims, 5 Drawing Sheets

US 8,116,820 B2

METHOD FOR TRANSMITTING DATA IN MULTIPLE ANTENNA SYSTEM

CROSS-REFERENCE TO RELATED APPLICATIONS

This application claims the benefit of priority of Korean Patent Application No. 10-2008-0022312 filed on Mar. 11, 2008 which is incorporated by reference in its entirety herein.

FIELD OF THE INVENTION

The present invention relates to a data transmission method and, more particularly, to a method for transmitting data in a multi-antenna system.

DESCRIPTION OF THE RELATED ART

Due to the generalization of information communication services and the advent of various multimedia services and quality services, demand for communication services is increasing. To meet the demand, diverse wireless communication technologies are under study in multiple sectors.

A multi-input multi-output (MIMO) system refers to a system improving data transmission/reception efficiency by using multiple transmit antennas and multiple receive antennas. Recently, research on the channel capacity of a multi-user MIMO system for allowing multiple users to effectively use space resources has been actively progressing.

A dirty paper coding (DPC) scheme, in which a base station removes data of other users acting as interference in advance to thus reduce interference from other users, provides a maximum channel capacity in the multi-user MIMO system. However, a large amount of channel information and complex calculations (i.e., computations, operations) required at a transmitter make it difficult to implement the DPC scheme in an actual system.

As a substitute for the DPC scheme, a random beamforming (RBF) scheme was proposed in "On the Capacity of MIMO Broadcast Channels with Partial Side Information" by M. Sharif and B. Hassibi, pp. 506-522 of IEEE Trans. Inform. Theory, vol. 51, no. 2, February 2005. In the proposed scheme, a transmitter performs beamforming with an arbitrary weight value by using multiple antennas to induce a channel change. Using spatial multi-user diversity, the RBF scheme obtains similar efficiency to DPC but with a large number of users. Specifically, if the number of users is only around 10 to 100, as it generally is in an actual communication environment, the efficiency of the RBF is drastically degraded.

In an effort to solve this problem, a multi-mode scheme was presented in "Enhanced Multiuser Random Beamforming: Dealing with the Not So Large Number of Users Case" by M. Kountouris, D. Gesbert and T. Salzer, JASC, November 2007. This scheme includes two steps: receiving feedback of channel information from respective users in the same manner as the existing random beamforming scheme; and then receiving feedback of channel information again from a selected user. According to this scheme, the number of transmission signals changes adaptively from 1 to $N_T$ according to the number of users. Meanwhile, "A Dual-Mode Limited Feedback Multiuser Downlink System: Trading Off Multiplexing Gain for Capacity Growth" proposed by C. K. Au-Yeung, S. Y. Park, and D. J. Love, IEEE Trans. Sig. Proc., January 2007 discloses another multi-mode scheme adopting a dual mode in which $N_T$ number of signals is transmitted if there are many users, while one signal is transmitted if there are not many users.

However, of the above two multi-mode schemes, the former has a problem in that the selected user feeds back the channel information twice, increasing the feedback amount. In addition, since both multi-mode schemes rely on instantaneous channel information, feedback information for mode selection should be transmitted to a base station in addition to existing feedback information each time user channels change or a random beam vector changes. In addition, the mode for transmitting the $N_T$ number of signals may be selected any time, causing a problem that $\text{Log}_2 N_T$ bits should always be transmitted to feed back a random beam index to the base station. Also, each time the feedback information is transmitted, the users and base station should perform additional, complicating calculations to determine a transmission mode.

SUMMARY OF THE INVENTION

Therefore, an object of the present invention is to provide a data transmission method having a high data rate even in an environment in which the number of users is not large.

Another object of the present invention is to reduce the feedback amount of channel information to a base station and the calculation complexity in calculating a transmission mode.

In an aspect, a method for transmitting data in a multi-antenna system includes determining a candidate mode in which a maximum upperbound approximation of an average total data rate is maximized as a transmission mode, selecting a user equipment to receive data by using the transmission mode, and transmitting data to the selected user equipment.

In another aspect, a method for receiving data by a user equipment in a multi-antenna system includes receiving a transmission mode, transmitting a reception SINR with respect to the transmission mode to a base station, and receiving data by a UE selected according to the reception SINR, wherein the transmission mode is a candidate mode in which a maximum upperbound approximation of an average total data rate is maximized.

DETAILED DESCRIPTION OF THE INVENTION

Exemplary embodiments of the present invention will now be described in detail with reference to the accompanying drawings.

Figure 1:
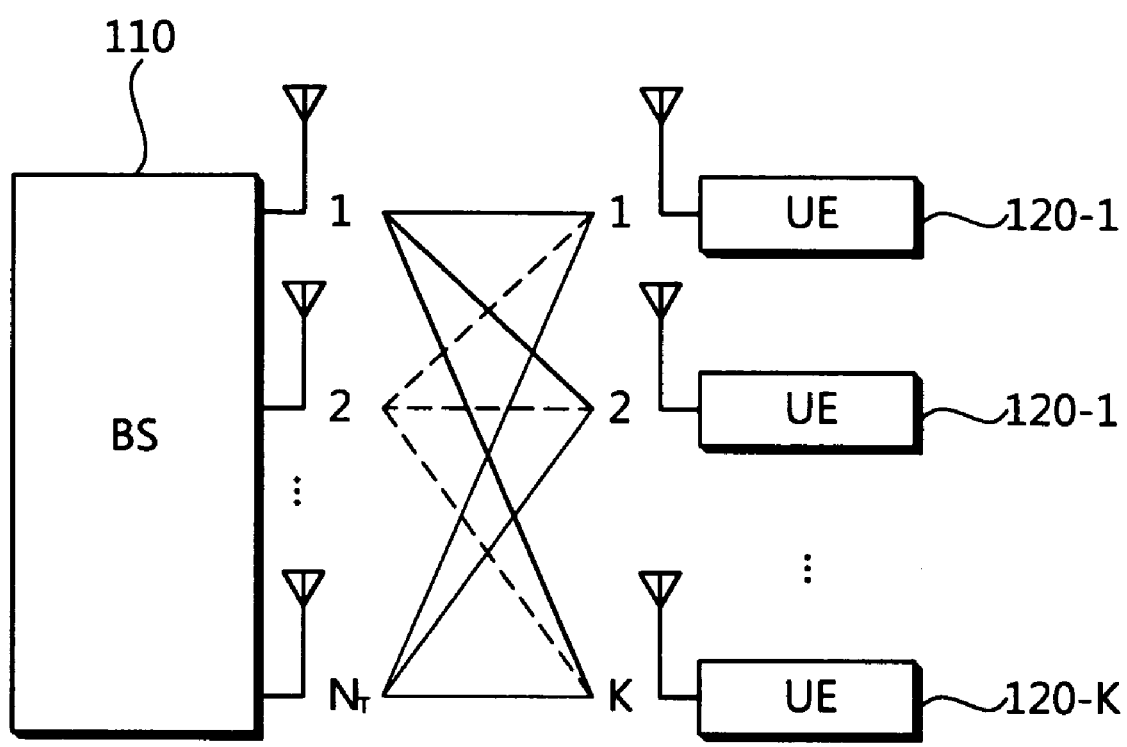
FIG. 1 is a schematic block diagram illustrating a wireless communication system according to an embodiment of the present invention.

FIG. 1 is a schematic block diagram illustrating a wireless communication system. The wireless communication system is widely used to provide a variety of communication services such as communication of voice, packet data, etc.

Referring to FIG. 1, a base station (BS) 110 includes $N_T$ number of antennas, and K number of UEs 120-1, 120-2, . . . , 120-K each have a single receive antenna. Here, the UEs 120-1 to 120-K may be fixed or mobile, and may be referred to by other names such as mobile station (MS), user terminal (UT), subscriber station (SS), wireless device, user, etc. The BS 110 generally refers to a fixed station that communicates with the UEs 120 and may be called by other names such as node-B, base transceiver system (BTS), access point, etc.

On the assumption that the BS 110 transmits M number of signals, a reception signal $y_k$ of the kth UE 120-K can be represented by Equation 1 shown below:

$$y_k = \sum_{m=1}^{M} h_k w_m s_m + n_k, \quad [\text{Equation 1}]$$
$$k = 1, \ldots, K$$

wherein 'M' is a mode, $h_k$ is a $1 \times N_T$ independent identically distributed (i.i.d) complex Gaussian channel matrix in which each element has a complex Gaussian distribution with zero mean and variance 1, $w_m (1 \leq m \leq M)$ is an $N_T \times 1$ random beam emanating from the BS in which $1 \leq M \leq N_T$ and respective random beams are orthogonal, $s_m$ is a data signal transmitted by using the mth random beam from the BS, and $n_k$ is noise at a reception end that has the complex Gaussian distribution of zero mean and variance 1.

Figure 2:
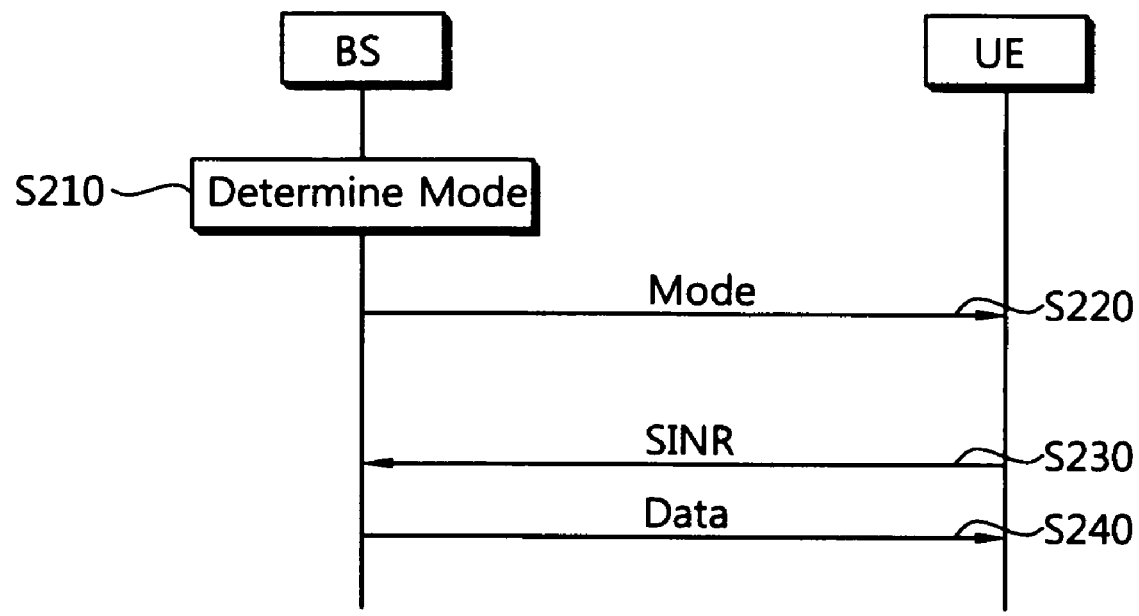
FIG. 2 is a flowchart illustrating a data transmission method according to an embodiment of the present invention.

FIG. 2 is a flowchart illustrating a data transmission method according to an embodiment of the present invention.

Referring to FIG. 2, the BS determines a transmission mode (S210). Here, a mode refers to the number of streams that can be simultaneously transmitted, and the transmission mode refers to a mode determined for transmitting data among candidate modes. For example, when the mode is 2, two streams can be simultaneously transmitted via multiple antennas. The mode may be also called a rank.

The method for determining the transmission mode will be described later.

Next, the BS transmits the determined transmission mode to UEs (S220).

And then, the UEs each feed a reception SINR (Signal to Interference and Noise Ratio) with respect to the transmission mode back to the BS (S230). Here, the reception SINR fed back to the BS may be a reception SINR with respect to a random beam with a maximum reception SINR, among SINRs with respect to the transmission mode. The reception SINR may be obtained by using Equation 2 shown below:

$$SINR_{m,k} = \frac{|h_k w_m|^2}{\sum_{j=1, j \neq m}^{M} |h_k w_j|^2 + \frac{M}{\rho}} \quad [\text{Equation 2}]$$

wherein $SINR_{m,k}$ is an SINR at the mth random beam $w_m$ of the kth UE when the BS transmits the M number of signals, and $\rho$ is an average reception SNR which has the same value for every UE. Thus, if it is assumed that transmission power of each data signal $s_m$ with respect to all the UEs is equally distributed, the data signal $s_m$ is transmitted as transmission power of $\rho/M$.

Here, UEs may feed back information about the random beam with the maximum reception SINR to the BS. The number of bits required for feeding back the information about the random beam to the BS is $\log_2 M$ (M is a transmission mode). In the related art, when the number of antennas of the BS is $N_T$, the UEs always require $\log_2 N_T$ number of bits to feed back the information about the random beam, but in the present invention, the required number of bits can be reduced.

Thereafter, the BS selects UEs that are to receive data, by using the reception SINRs received from the respective UEs (S240). Namely, the BS selects UEs with the largest reception SINR values by random beams among the K number of UEs, and transmits a data signal to the selected M number of UEs.

Figure 3:
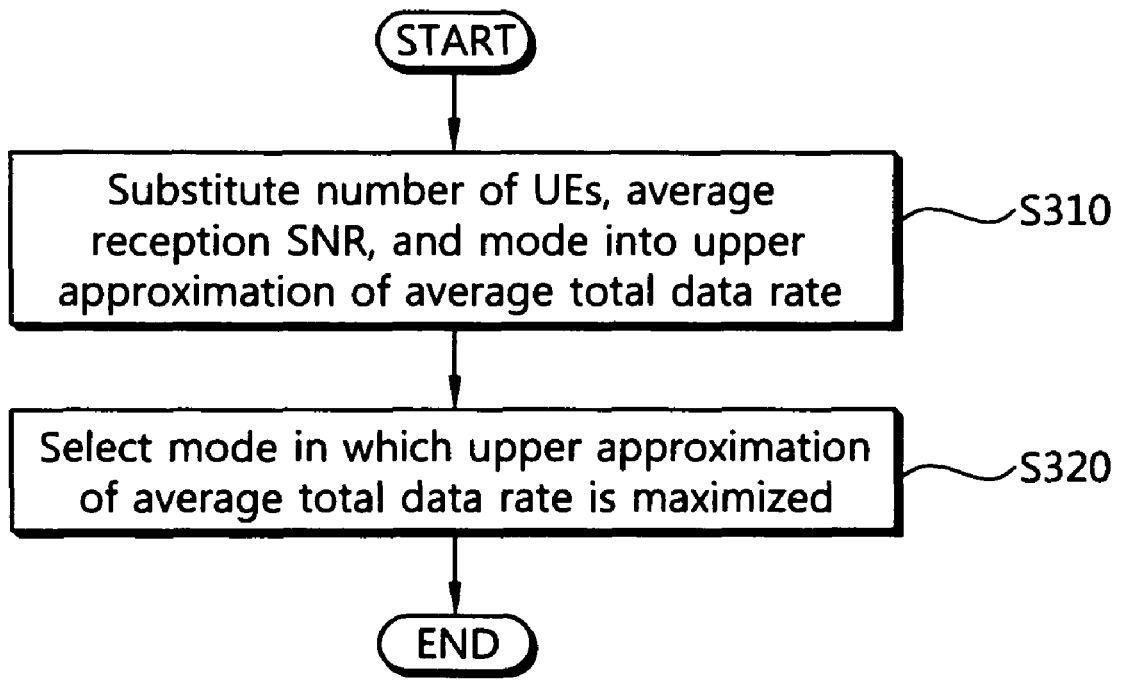
FIG. 3 is a flowchart illustrating a transmission mode determining method according to an embodiment of the present invention.

FIG. 3 is a flowchart illustrating a transmission mode determining method according to an embodiment of the present invention.

Referring to FIG. 3, the number of current users, an average reception SNR of each user, and a candidate mode are substituted into an upperbound approximation of an average total data rate (S310).

In order to determine a transmission mode, an average total data rate is used. Namely, a candidate mode with a maximum value of the average total data rate $E\{R_{sum}\}$ as represented by Equation 3 shown below is chosen as a transmission mode for data transmission:

$$E\{R_{sum}\} = E\left\{\sum_{m=1}^{M} \log_2\left(1 + \max_{1 \leq k \leq K} SINR_{m,k}\right)\right\} \quad [\text{Equation 3}]$$

wherein $E\{R_{sum}\}$ is an average total data rate and 'M' is a candidate mode. Equation 3 can be approximated as Equation 4 shown below:

$$E\{R_{sum}\} \approx ME\left\{\log_2\left(1 + \max_{1 \leq k \leq K} SINR_{1,k}\right)\right\} \quad [\text{Equation 4}]$$
$$\triangleq ME\{\log_2(1 + x)\}$$

wherein $$x = \max_{1 \leq k \leq K} SINR_{1,k},$$

'K' is the number of UEs, and $SINR_{1,K}$ is an SINR at a first random beam of the kth UE.

However, no method for searching for a transmission mode for transmitting signals by directly using Equations 3 and 4 regarding the average total data rate $E\{R_{sum}\}$ has been discovered yet, and the solution is not easy. Thus, in order to select a transmission mode, an upperbound approximation of an average total data rate is used instead. Equation 5 obtained by using Jensen inequality represents the upper limit of the average total data rate.

$$E\{R_{sum}\} \leq M \log_2(1 + E\{x\}) \quad [\text{Equation 5}]$$

wherein $E\{R_{sum}\}$ is the average total data rate, 'M' is a candidate mode, $$x = \max_{1 \leq k \leq K} SINR_{1,k},$$

'K' is the number of UEs, and $SINR_{1,k}$ is an SINR at the first random beam of the kth UE.

The upperbound approximation of the average total data rate can be obtained by using the number of users present in the current system and an average reception SNR of the users. Here, generally, the BS can recognize the number of users present in the current system through essential signaling for scheduling participation, and the average reception SNR is periodically reported to the BS.

The upperbound approximation of the average total data rate can be represented by Equation 6 shown below:

[Equation 6]

[Equation 6(a)]

$$E\{R_{sum,M=1}\} \leq \log_2\left(1 + \rho \sum_{k=1}^{K} \frac{1}{k}\right), \text{ for } M = 1$$

[Equation 6(b)]

$$E\{R_{sum}\} \leq$$
$$M\log_2\left(\frac{a\rho}{M}\sum_{k=1}^{K}\frac{1}{k} + \frac{ab\rho^2(M-1)^2}{M^2}e^{-\frac{M}{\rho(M-1)}}H(K,b,\xi,M) + \right.$$
$$\frac{a\rho(M-1)}{M}\log\frac{M}{\rho(M-1)} +$$
$$\left. a + \frac{\rho(M-1)}{M}c\right), \text{ for } M \geq 2$$

Here, when 'M' is 1, Equation 6(a) is applied, and if 'M' is 2 or larger, Equation 6(b) is applied. M=1 is substituted into Equation 6(a), and M=2, 3, ..., $N_T$ is substituted into Equation 6(b). $\rho$ is an average reception SNR, 'K' is the number of users, and 'a', 'b', 'c' are arbitrary constants for approximation that can be obtained by using a Rambert W function W(t).

Here, an approximation of the Rambert W function W(t) is represented by Equation 7 shown below:

$$W(t) \approx a\log(t+b)+c \quad \text{[Equation 7]}$$

wherein the values 'a', 'b', 'c' may vary according to the range of 't', and preferably, they are 0.6 to 0.7, 0.6 to 0.7, and 0.2 to 0.3, respectively. More preferably, 'a', 'b', and 'c' are 0.665, 0.6728, and 0.2636, respectively.

$H(K,b,\xi,M)$ in Equation 6 is defined by Equation 8 shown below:

$$H(K, b, \xi, M) = \quad \text{[Equation 8]}$$
$$\sum_{k=1}^{K}\binom{K}{k}(-1)^k \frac{{}_2F_1(1, k(M-1)+1; k(M-1)+2; -b/\xi)}{k(M-1)+1}$$

wherein $$\xi = \frac{M}{\rho(M-1)}e^{\frac{M}{\rho(M-1)}},$$

and ${}_2F_1(\alpha,\beta;\gamma;Z)$ is a Gauss Hypergeometric function. Here, the Gauss Hypergeometric function is a solution to the hypergeometric differential equation, which has a regular singular point at the origin.

M=1, 2, ... $N_T$ is substituted into Equation 6, and 'M' with the largest upperbound approximation of the average total data rate is determined as a transmission mode for signal transmission (S320).

Equations 5 and 6 were originally proposed by the present inventor. With the number of users and the average reception SNR known, the transmission mode can be easily determined by using Equation 6.

Figure 4:
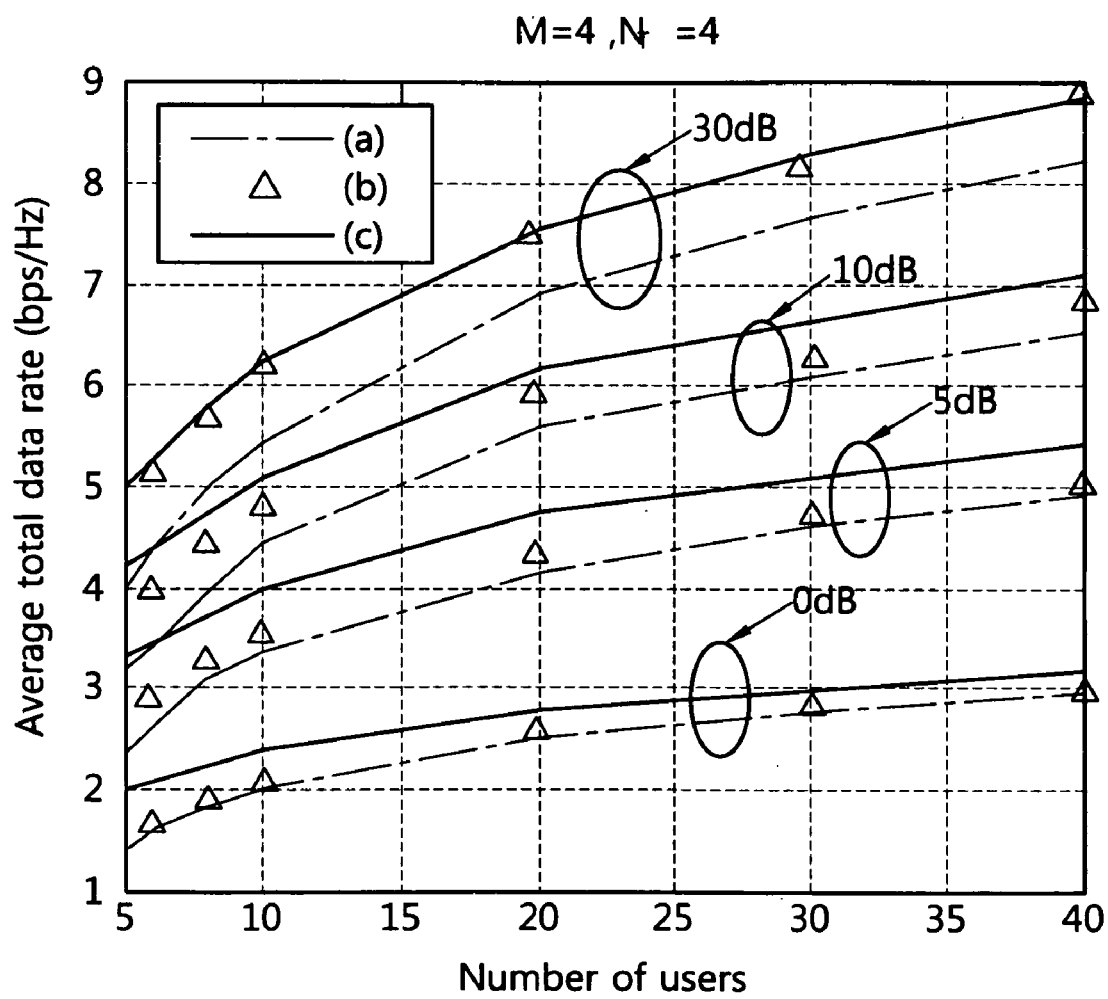
FIG. 4 is a graph of average total transmission rate versus number of users when the number of antennas of a base station ($N_T$) is 4 and a transmission mode is 4.

FIG. 4 is a graph of average total transmission rate versus number of UEs when the number of antennas of the BS ($N_T$) is 4 and a transmission mode is 4. In the graph shown in FIG. 4, (a) experimentally represents an ideal average total data rate such as Equation 3, (b) experimentally represents the upper limit of the average total data rate such as Equation 5, and (c) represents an upperbound approximation of the average total data rate such as Equation 6.

Referring to FIG. 4, the ideal average total data rate (a) and the upper limit of the average total transmission rate (b) have a similar tendency. Namely, their increasing tendency is similar although there is some difference in the absolute values of (a) and (b). Accordingly, it can be considered that when the upper limit of the average total transmission rate is maximized, the average total transmission rate is maximized, and thus, the transmission mode can be determined by using the upper limit of the average total transmission rate.

Also, it is noted that the upper limit of the average total data rate (b) and the approximate value (c) are substantially identical, and as the SNR rises, the results become completely consistent with each other. Because Equation 6 well reflects the propensity of the average total transmission rate, it would be quite effective to select the transmission mode by using the upperbound approximation of the average total data rate such as Equation 6.

Table 1 below shows optimum transmission modes over the provided average reception SNR and the number of users obtained according to embodiments of the present invention.

TABLE 1

| | | Average reception SNR (dB) | | | | |
|---|---|---|---|---|---|---|
| | | 0 dB | 5 dB | 10 dB | 20 dB | 30 dB |
| Number of users | 10 | 4 | 2 | 2 | 1 | 1 |
| | 20 | 4 | 3 | 2 | 2 | 1 |
| | 50 | 4 | 4 | 3 | 2 | 2 |
| | 80 | 4 | 4 | 3 | 2 | 2 |
| | 100 | 4 | 4 | 3 | 2 | 2 |
| | 120 | 4 | 4 | 3 | 2 | 2 |

Figure 5:
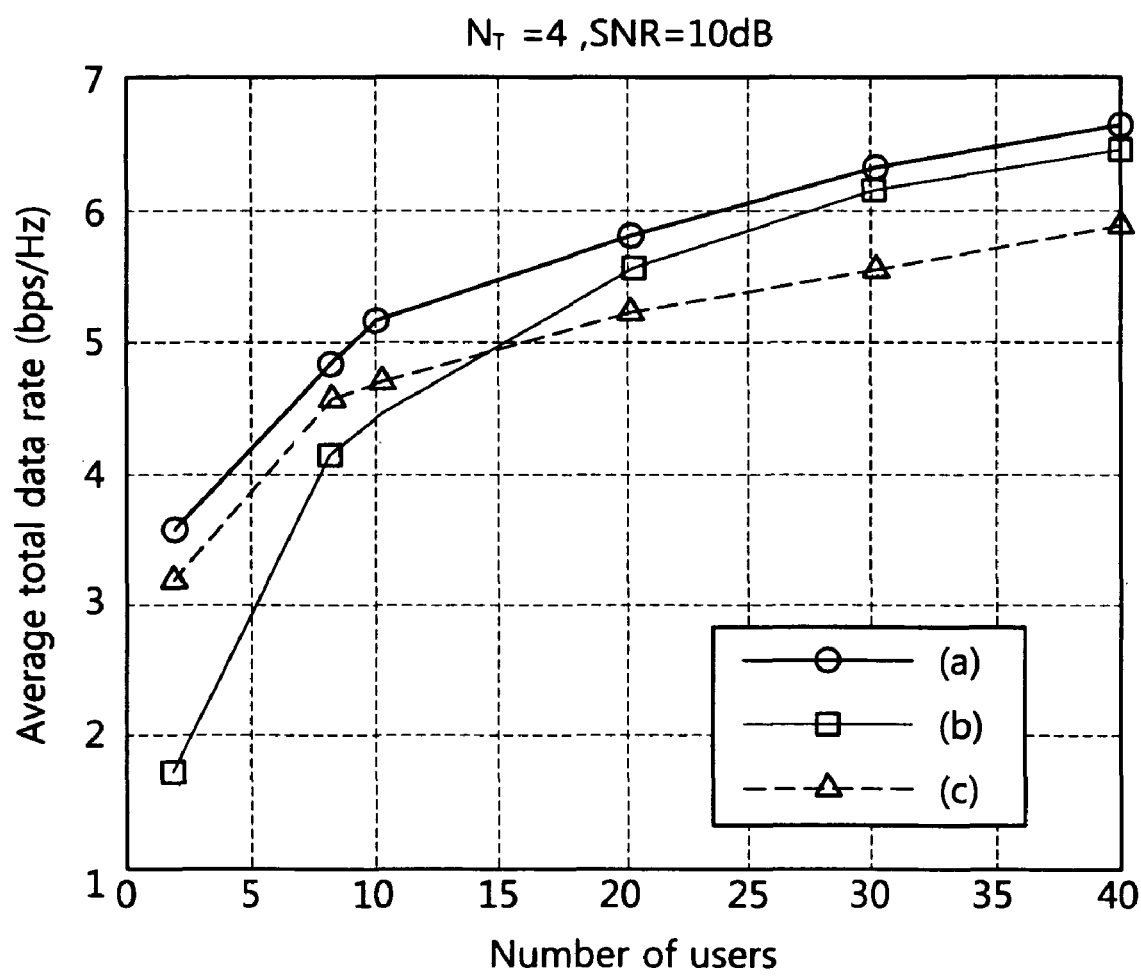
FIG. 5 is a graph of average total transmission rate versus number of users when the number of antennas of a base station ($N_T$) is 4 and an SNR is 10 dB according to an embodiment of the present invention and the related art.

FIG. 5 is a graph of average total transmission rate versus number of users when the number of antennas of the BS ($N_T$) is 4 and the SNR is 10 dB according to an embodiment of the present invention and the related art. In the graph shown in FIG. 5, (a) was obtained according to an embodiment of the present invention, (b) was obtained according to a conventional random beamforming scheme, and (c) was obtained according to the dual-mode scheme of the instantaneous multi-mode scheme. In this case, it was assumed that the step of feeding back from the UE to the BS was performed one time like the conventional random beamforming scheme, so the two-step method of the instantaneous multi-mode scheme was excluded from comparison.

Referring to FIG. 5, it is noted that a superior average total data rate can be obtained according to the embodiment of the present invention compared to the related art. Although the number of users is 40 or less, (a) of the present invention shows better performance than the conventional random beamforming scheme (b) and the dual-mode scheme (c).

The BS determines a candidate mode in which the average total data rate is maximized as the transmission mode, so the average total data rate can be maximized by optimizing the number of random beams according to the number of users. In addition, because UEs feed back on the assumption of one mode determined by the BS, sufficient multi-user gain can be acquired.

Moreover, in determining the transmission mode, only the number of users and the average reception SNR value are considered, not change in the instantaneous SINR, so the complexity of calculating the transmission mode can be reduced.

Furthermore, when the UE feeds back the random beam index to the BS, only as many as $\log_2 M$ bits are required, thereby reducing the amount of feedback information compared to the related art which requires as many as $\log_2 N_T$ bits.

Even in an environment in which there are not many users, data can be transmitted at a desirable data rate. In addition, because a base station determines a transmission mode again only when the number of users or an average reception SNR changes, the amount of feedback from a UE and the calculation complexity in determining the transmission mode can be reduced. Moreover, the number of bits required for transmitting a random beam index can be reduced.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method for transmitting data in a multi-antenna system, the method comprising:
    determining a candidate mode in which a maximum upperbound approximation of an average total data rate is maximized as a transmission mode;
    selecting a user equipment to receive data by using the transmission mode; and
    transmitting data to the selected user equipment using the transmission mode,
    wherein the transmission mode is a number of streams that can be simultaneously transmitted through multiple antennas.

2. The method of claim 1, wherein the upperbound approximation of the average total data rate is obtained by using the number of current users and an average reception signal to noise ratio (SNR) of each user.

3. The method of claim 2, wherein the upperbound approximation of the average total data rate is represented by the equation shown below:

$$E\{R_{sum,M=1}\} \le \log_2\left(1 + \rho \sum_{k=1}^{K} \frac{1}{k}\right), \text{ for } M = 1$$

$$E\{R_{sum}\} \le M\log_2\left(\frac{a\rho}{M}\sum_{k=1}^{K}\frac{1}{k} + \frac{ab\rho^2(M-1)^2}{M^2}e^{-\frac{M}{\rho(M-1)}}H(K,b,\xi,M) + \frac{a\rho(M-1)}{M}\log\frac{M}{\rho(M-1)} + a + \frac{\rho(M-1)}{M}c\right), \text{ for } M \ge 2$$

wherein 'M' is the candidate mode, $\rho$ is the average reception SNR, 'K' is the number of current users, 'a', 'b', 'c' are arbitrary constants for approximation, $$H(K, b, \xi, M) = \sum_{k=1}^{K}\binom{K}{k}(-1)^k \frac{{}_2F_1(1, k(M-1)+1; k(M-1)+2; -b/\xi)}{k(M-1)+1},$$

$$\xi = \frac{M}{\rho(M-1)}e^{\frac{M}{\rho(M-1)}},$$

and ${}_2F_1(\alpha,\beta;\gamma;Z)$ is a Gauss Hypergeometric function.

4. The method of claim 1, wherein the selecting of the user equipment comprises:
    informing each user equipment about the transmission mode;
    receiving a reception signal to interference and noise ratio (SINR) with respect to the transmission mode from each user equipment; and
    selecting the user equipment to receive data by using the reception SINR.

5. A method for receiving data by a user equipment in a multi-antenna system, the method comprising:
    receiving a transmission mode;
    transmitting a reception signal to interference and noise ratio (SINR) with respect to the transmission mode to a base station; and
    receiving data by a user equipment selected according to the reception SINR,
    wherein the transmission mode is a candidate mode in which a maximum upperbound approximation of an average total data rate is maximized, and
    the transmission mode is a number of streams that can be simultaneously transmitted through multiple antennas.

6. The method of claim 5, wherein the upperbound approximation of the average total data rate is obtained by using the number of current users and an average reception signal to noise ratio of each user.

* * * * *